United States Patent
Fan

(10) Patent No.: US 9,008,994 B2
(45) Date of Patent: Apr. 14, 2015

(54) PORTABLE ELECTRONIC DEVICE, STORAGE MEDIUM AND METHOD FOR REPORTING LOCATION OF THE PORTABLE ELECTRONIC DEVICE

(75) Inventor: Jay Fan, New Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 439 days.

(21) Appl. No.: 13/461,747

(22) Filed: May 1, 2012

(65) Prior Publication Data

US 2013/0158938 A1    Jun. 20, 2013

(30) Foreign Application Priority Data

Dec. 14, 2011   (TW) ................................ 100146336

(51) Int. Cl.
*G06F 15/00*   (2006.01)
*G01P 15/00*   (2006.01)
*G01S 19/14*   (2010.01)
*G01C 21/16*   (2006.01)

(52) U.S. Cl.
CPC .................. *G01S 19/14* (2013.01); *G01C 21/16* (2013.01)

(58) Field of Classification Search
CPC ........... G06F 1/1626; G06F 3/01; G06F 3/03; G06F 3/0346; G01S 19/14; G08B 21/24; G09G 5/00; H04W 4/028; H04W 4/023; G01C 21/16; G01C 21/20
USPC .......... 702/104, 141, 151; 345/156, 169, 619; 455/456.1; 701/45, 472
See application file for complete search history.

(56) References Cited

U.S. PATENT DOCUMENTS

| | | | |
|---|---|---|---|
| 8,818,405 B2 * | 8/2014 | Sheilendra | ................. 455/456.1 |
| 2010/0141435 A1 | 6/2010 | Breed | |
| 2013/0158928 A1 * | 6/2013 | Hogdal | ......................... 702/104 |

* cited by examiner

*Primary Examiner* — John H Le
(74) *Attorney, Agent, or Firm* — Novak Druce Connolly Bove + Quigg LLP

(57) ABSTRACT

In a method for reporting a location of a portable electronic device, an acceleration of the portable electronic device is detected via an accelerometer of the portable electronic device. The portable electronic device is determined as falling when a difference between the acceleration of the portable electronic device and an acceleration of gravity is in a predetermined range. An angular velocity of the portable electronic device is detected via a gyroscope of the portable electronic device when the portable electronic device is determined as falling. The portable electronic device is determined as static when the angular velocity of the portable electronic device equals zero. If the portable electronic device is static for a predetermined time period, location information of the portable electronic device is collected from a global position system receiver of the portable electronic device. The location information is sent to a target electronic device.

12 Claims, 3 Drawing Sheets

PORTABLE ELECTRONIC DEVICE, STORAGE MEDIUM AND METHOD FOR REPORTING LOCATION OF THE PORTABLE ELECTRONIC DEVICE

BACKGROUND

1. Technical Field

Embodiments of the present disclosure relate to the field of protecting electronic devices, and more particularly, to a portable electronic device, a storage medium and a method for reporting a location of the portable electronic device.

2. Description of Related Art

People are used to putting their portable electronic devices, such as mobile phones and personal digital assistants, in bags or coat pockets. If people are careless, the portable electronic devices may fall out of the bags or coat pockets and drop on the ground. If the people fail to see this and do not pick up the portable electronic devices, the portable electronic devices may be lost.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
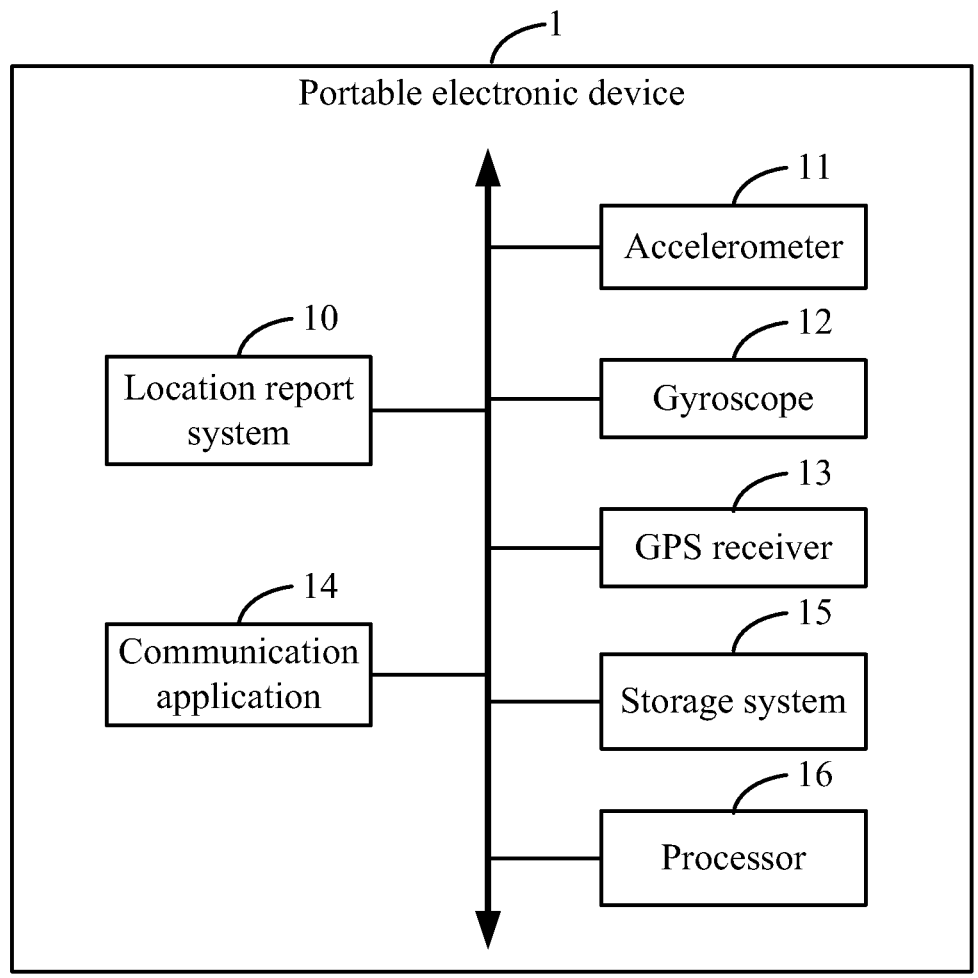
FIG. 1 is a block diagram of one embodiment of a portable electronic device including a location report system.

FIG. 1 is a block diagram of one embodiment of a portable electronic device 1 including a location report system 10, which can be used for reporting a location of the portable electronic device 1. In the embodiment, the portable electronic device 1 further includes an accelerometer 11, a gyroscope 12, a global positioning system (GPS) receiver 13, a communication application 14, a storage system 15, and at least one processor 16. The portable electronic device 1 may be, for example, a mobile phone, a personal digital assistant, a handheld game console, or a tablet computer. The location report system 10 may be in form of one or more programs that are stored in the storage system 15 and executed by the at least one processor 16. FIG. 1 is just one example of the portable electronic device 1 that can be included with more or fewer components than shown in other embodiments, or have a different configuration of the various components.

In the embodiment, the accelerometer 11 can detect an acceleration of the portable electronic device 1. The portable electronic device 1 in free fall accelerates at approximately acceleration of gravity (i.e., 9.8 m/s$^2$). So if the acceleration of the portable electronic device 1 is approximate to the acceleration of gravity, for example, a difference between the acceleration of the portable electronic device 1 and the acceleration of gravity is in a range from 0 to 0.2 m/s$^2$, the portable electronic device 1 can be considered as falling. However, it should be understood that other measurements may be used depending on the embodiment.

The gyroscope 12 detects an angular velocity of the portable electronic device 1. If the angular velocity of the portable electronic device 1 equals zero (or approximately zero), it is considered that the portable electronic device 1 is static (e.g., not in a moving state).

The GPS receiver 13 continually receives GPS satellite signals, and determines a geographic location of the portable electronic device 1 according to the GPS satellite signals. In the embodiment, the GPS receiver 13 can determine the location of the portable electronic device 1 by collecting the GPS satellite signals in a geographic region. The GPS satellite signals may indicate longitude and latitude information of the geographic region.

The portable electronic device 1 can communicate with one or more target electronic devices, such as mobile phones, handheld computers, or desktop computers through a network, such as a local area network or a wireless network. In the embodiment, the portable electronic device 1 communicates with the target electronic devices via the communication application 14. For example, the communication application 14 may be a short message service (SMS) application or an e-mail application.

In one embodiment, if the portable electronic device 1 falls to ground, the location report system 10 collects location information of the portable electronic device 1 from the GPS receiver 13. The location information indicates the location where the portable electronic device 1 falls to the ground. The location report system 10 further sends the location information to a target electronic device using the communication application 14, for reporting the location of the portable electronic device 1 to the user who specifies the target electronic device.

In one embodiment, the storage system 15 may be random access memory (RAM) for temporary storage of information, and/or a read only memory (ROM) for permanent storage of information. In other embodiments, the storage system 15 may also be an external storage device, such as a storage card or a data storage medium. The at least one processor 16 executes computerized operations of the portable electronic device 1 and other applications, to provide functions of the portable electronic device 1.

Figure 2:
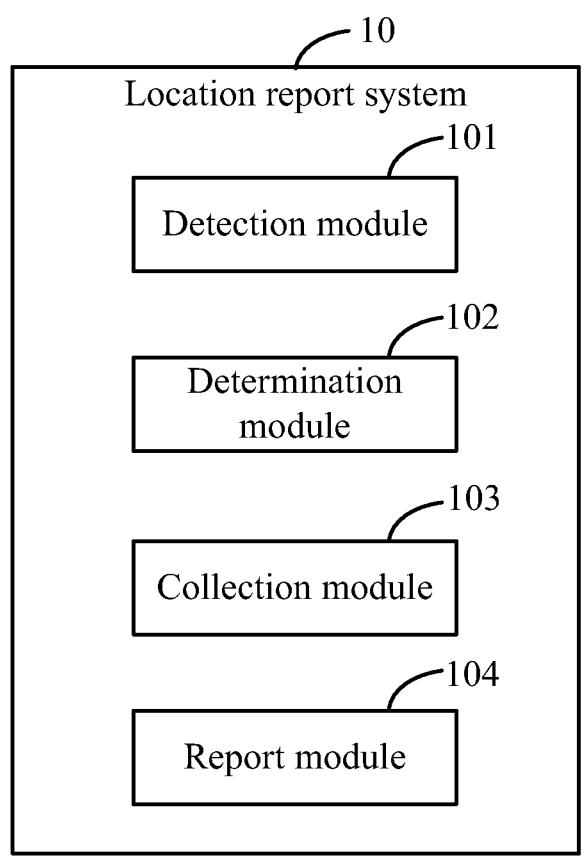
FIG. 2 is a block diagram of one embodiment of functional modules of the location report system included in the portable electronic device of FIG. 1.

FIG. 2 is a block diagram of one embodiment of functional modules of the location report system 10 included in the portable electronic device 1 of FIG. 1. In the embodiment, the location report system 10 may include a detection module 101, a determination module 102, a collection module 103, and a report module 104. The modules 101-104 may comprise a plurality of functional modules each comprising one or more programs or computerized codes that can be accessed and executed by the at least one processor 16. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable storage medium or other storage device. Some non-limiting examples of non-transitory computer-readable storage medium include CDs, DVDs, BLU-RAY, flash memory, and hard disk drives.

The detection module 101 continually detects acceleration of the portable electronic device 1 via the accelerometer 11, and determines whether the portable electronic device 1 is falling according to the detected acceleration of the portable electronic device 1. If a difference between the acceleration of the portable electronic device 1 and the acceleration of gravity is in a predetermined range, such as a range from 0 to 0.2 m/s$^2$, the detection module 101 determines that the portable electronic device 1 is falling.

The determination module 102 continually detects an angular velocity of the portable electronic device 1 via the gyroscope 12, and determines whether the portable electronic device 1 is static according to the detected angular velocity of the portable electronic device 1. If the angular velocity of the portable electronic device 1 equals zero, the determination module 102 determines that the portable electronic device 1 is static. The determination module 102 further determines whether the portable electronic device 1 is static for a predetermined time period, such as five seconds. If the portable electronic device 1 falls to ground, and the user does not pick up the portable electronic device 1 in the predetermined time period, the portable electronic device 1 may be lost.

The collection module 103 collects location information of the portable electronic device 1 from the GPS receiver 13 when the portable electronic device 1 is static for the predetermined time period. The location information indicates the location where the portable electronic device 1 falls to ground.

The report module 104 sends the location information to a target electronic device using the communication application 14, for reporting the location of the portable electronic device 1 to the user who specifies the target electronic device. In one example, the report module 104 sends a SMS message including the location information to the target electronic device according to a phone number of the target electronic device. In another example, the report module 104 sends an e-mail including the location information to the target electronic device according to an e-mail address.

Figure 3:
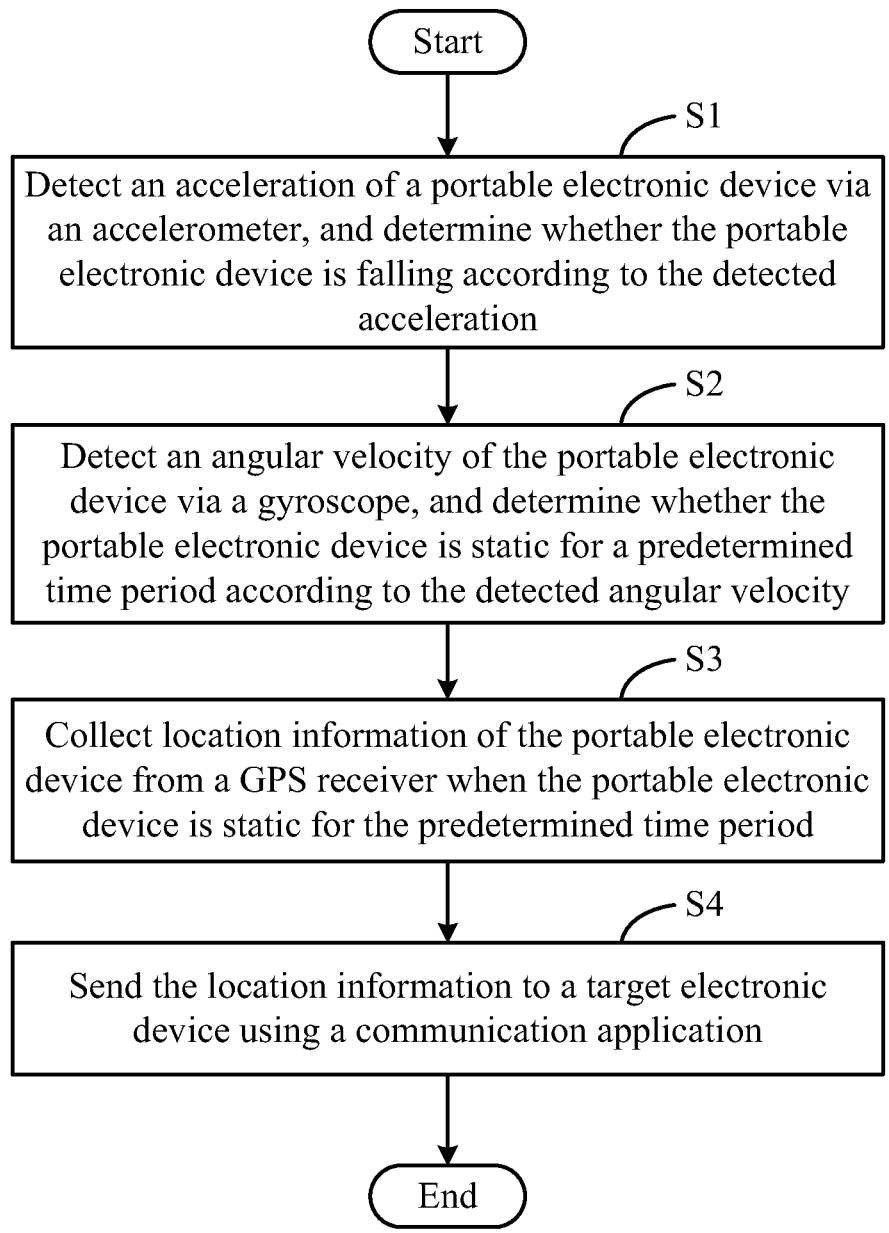
FIG. 3 is a flowchart of one embodiment of a method for reporting a location of the portable electronic device of FIG. 1.

FIG. 3 is a flowchart of one embodiment of a method for reporting a location of the portable electronic device 1 of FIG. 1. Depending on the embodiment, additional steps may be added, others removed, and the ordering of the steps may be changed.

In step S1, the detection module 101 continually detects an acceleration of the portable electronic device 1 via the accelerometer 11, and determines whether the portable electronic device 1 is falling according to the detected acceleration of the portable electronic device 1. If a difference between the acceleration of the portable electronic device 1 and an acceleration of gravity is in a predetermined range, the detection module 101 determines that the portable electronic device 1 is falling.

In step S2, the determination module 102 continually detects an angular velocity of the portable electronic device 1 via the gyroscope 12, and determines whether the portable electronic device 1 is static according to the detected angular velocity of the portable electronic device 1. If the angular velocity of the portable electronic device 1 equals zero, the determination module 102 determines that the portable electronic device 1 is static. If the portable electronic device 1 is static, the determination module 102 further determines whether the portable electronic device 1 is static for a predetermined time period.

In step S3, the collection module 103 collects location information of the portable electronic device 1 from the GPS receiver 13 when the portable electronic device 1 is static for the predetermined time period. The location information indicates the location where the portable electronic device 1 falls to the ground.

In step S4, the report module 104 sends the location information to a target electronic device using the communication application 14, for reporting the location of the portable electronic device 1 to the user who specifies the target electronic device.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A portable electronic device, comprising:
   a storage system;
   at least one processor;
   an accelerometer;
   a gyroscope;
   a global position system (GPS) receiver;
   one or more programs stored in the storage system and executed by the at least one processor, the one or more programs comprising:
   a detection module that detects an acceleration of the portable electronic device via the accelerometer, and determines whether the portable electronic device is falling according to the detected acceleration of the portable electronic device;
   a determination module that detects an angular velocity of the portable electronic device via the gyroscope when the portable electronic device is determined as falling, and determines whether the portable electronic device is static for a predetermined time period according to the detected angular velocity of the portable electronic device;
   a collection module that collects location information of the portable electronic device from the GPS receiver when the portable electronic device is static for the predetermined time period; and
   a report module that sends the location information to a target electronic device using a communication application of the portable electronic device.

2. The portable electronic device of claim 1, wherein the detection module determines that the portable electronic device is falling when a difference between the acceleration of the portable electronic device and an acceleration of gravity is in a predetermined range.

3. The portable electronic device of claim 1, wherein the determination module determines that the portable electronic device is static when the angular velocity of the portable electronic device equals zero.

4. The portable electronic device of claim 1, wherein the communication application is a short message service application or an e-mail application.

5. A method for reporting a location of a portable electronic device, the method comprising:
   (a) detecting an acceleration of the portable electronic device via an accelerometer of the portable electronic device, and determining whether the portable electronic device is falling according to the detected acceleration of the portable electronic device;
   (b) detecting an angular velocity of the portable electronic device via a gyroscope of the portable electronic device when the portable electronic device is determined as falling, and determining whether the portable electronic device is static for a predetermined time period according to the detected angular velocity of the portable electronic device;
   (c) collecting location information of the portable electronic device from a global position system receiver of the portable electronic device when the portable electronic device is static for the predetermined time period; and (d) sending the location information to a target electronic device using a communication application of the portable electronic device.

6. The method of claim 5, wherein the step (a) comprises:
determining that the portable electronic device is falling when a difference between the acceleration of the portable electronic device and an acceleration of gravity is in a predetermined range.

7. The method of claim 5, wherein the step (b) comprises:
determining that the portable electronic device is static when the angular velocity of the portable electronic device equals zero.

8. The method of claim 5, wherein the communication application is a short message service application or an e-mail application.

9. A non-transitory storage medium storing a set of instructions, the set of instructions capable of being executed by a processor of a portable electronic device, causes the processor to execute a method for reporting a location of the portable electronic device, the method comprising:

(a) detecting an acceleration of the portable electronic device via an accelerometer of the portable electronic device, and determining whether the portable electronic device is falling according to the detected acceleration of the portable electronic device;

(b) detecting an angular velocity of the portable electronic device via a gyroscope of the portable electronic device when the portable electronic device is determined as falling, and determining whether the portable electronic device is static for a predetermined time period according to the detected angular velocity of the portable electronic device;

(c) collecting location information of the portable electronic device from a global position system receiver of the portable electronic device when the portable electronic device is static for the predetermined time period; and (d) sending the location information to a target electronic device using a communication application of the portable electronic device.

10. The storage medium of claim 9, wherein the step (a) comprises:
determining that the portable electronic device is falling when a difference between the acceleration of the portable electronic device and an acceleration of gravity is in a predetermined range.

11. The storage medium of claim 9, wherein the step (b) comprises:
determining that the portable electronic device is static when the angular velocity of the portable electronic device equals zero.

12. The storage medium of claim 9, wherein the communication application is a short message service application or an e-mail application.

* * * * *